No. 847,901. PATENTED MAR. 19, 1907.
J. P. CALDWELL & W. A. ROCKWELL.
PLANTER.
APPLICATION FILED OCT. 1, 1906.

3 SHEETS—SHEET 1.

WITNESSES
Samuel E. Wade
Amos W. Hart

INVENTORS
JAMES P. CALDWELL
WARREN A. ROCKWELL
BY Munn & Co.
ATTORNEYS

No. 847,901. PATENTED MAR. 19, 1907.
J. P. CALDWELL & W. A. ROCKWELL.
PLANTER.
APPLICATION FILED OCT. 1, 1906.

3 SHEETS—SHEET 2.

WITNESSES

INVENTORS
JAMES P. CALDWELL
WARREN A. ROCKWELL
BY
ATTORNEYS

No. 847,901. PATENTED MAR. 19, 1907.
J. P. CALDWELL & W. A. ROCKWELL.
PLANTER.
APPLICATION FILED OCT. 1, 1906.

3 SHEETS—SHEET 3.

WITNESSES
Samuel C. Wade
Amos W. Hart

INVENTORS
JAMES P. CALDWELL
WARREN A. ROCKWELL
BY Munn & Co.
ATTORNEYS

UNITED STATES PATENT OFFICE.

JAMES PHILO CALDWELL, OF WINNSBORO, SOUTH CAROLINA, AND WARREN AYRES ROCKWELL, OF HARRIMAN, TENNESSEE.

PLANTER.

No. 847,901.  Specification of Letters Patent.  Patented March 19, 1907.

Application filed October 1, 1906. Serial No. 336,926.

*To all whom it may concern:*

Be it known that we, JAMES PHILO CALDWELL, of Winnsboro, in the county of Fairfield and State of South Carolina, and WARREN AYRES ROCKWELL, of Harriman, in the county of Roane and State of Tennessee, citizens of the United States, have invented an Improved Planter, of which the following is a specification.

Our invention is an improvement upon the planters for which Letters Patent No. 643,942, dated February 20, 1900, and Patent No. 727,285, dated May 5, 1903, were granted to James P. Caldwell.

The invention is particularly adapted for planting cotton-seed, but is also adapted for other kinds of seed, such as corn and peas.

The construction, arrangement, and operation of parts constituting our invention are as hereinafter described, and illustrated in the accompanying drawing, in which—

Figure 1:
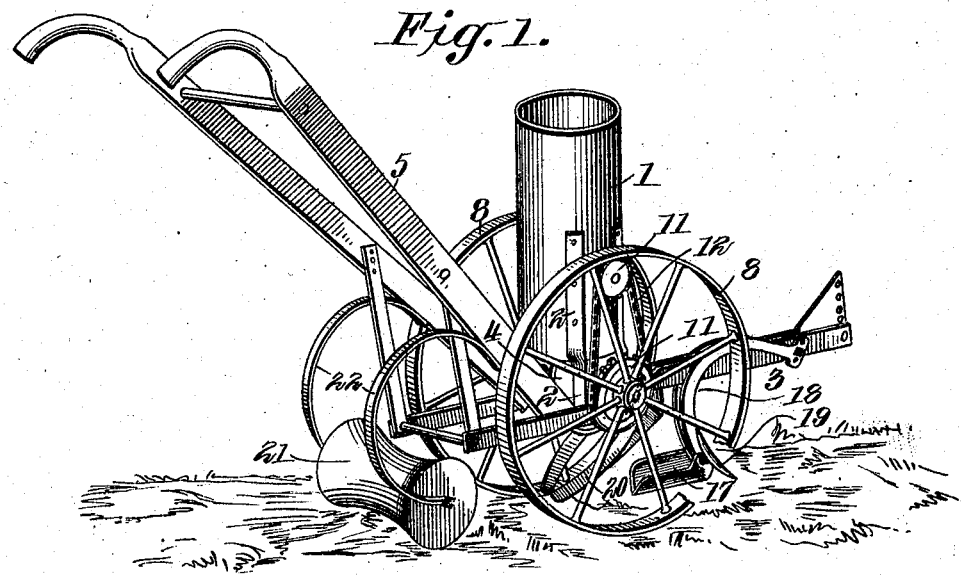
Figure 2:
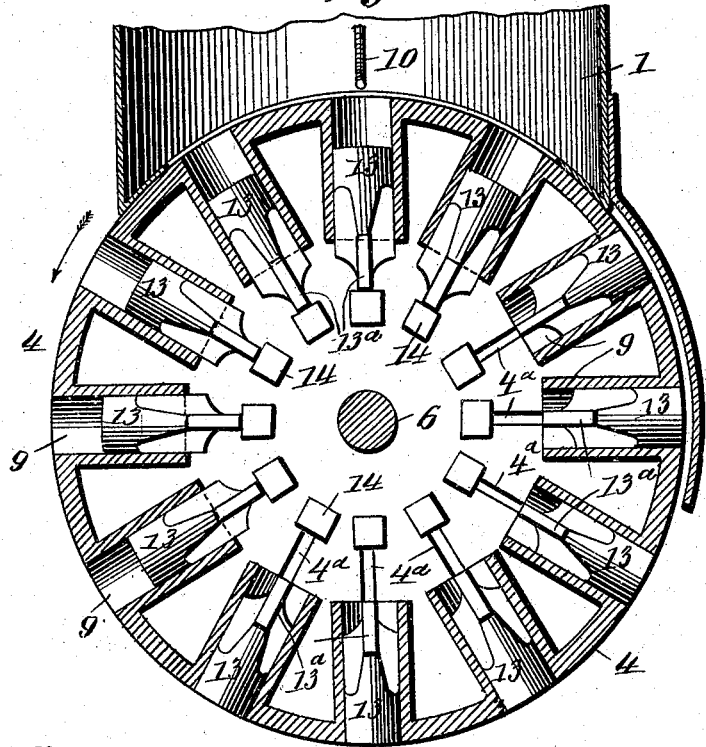
Figure 3:
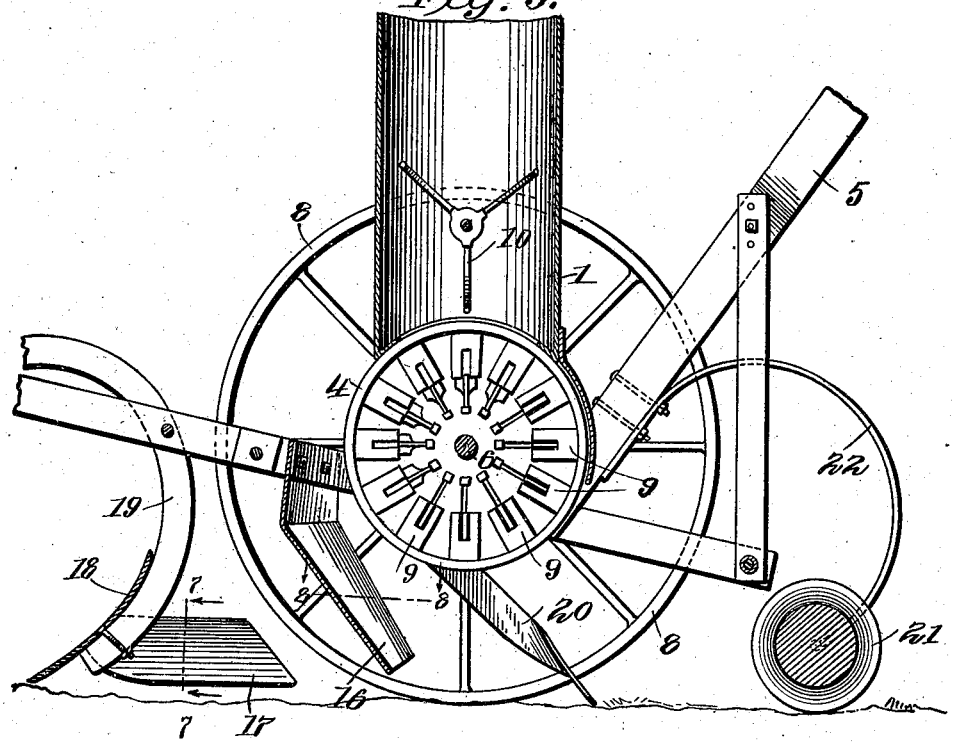
Figure 4:
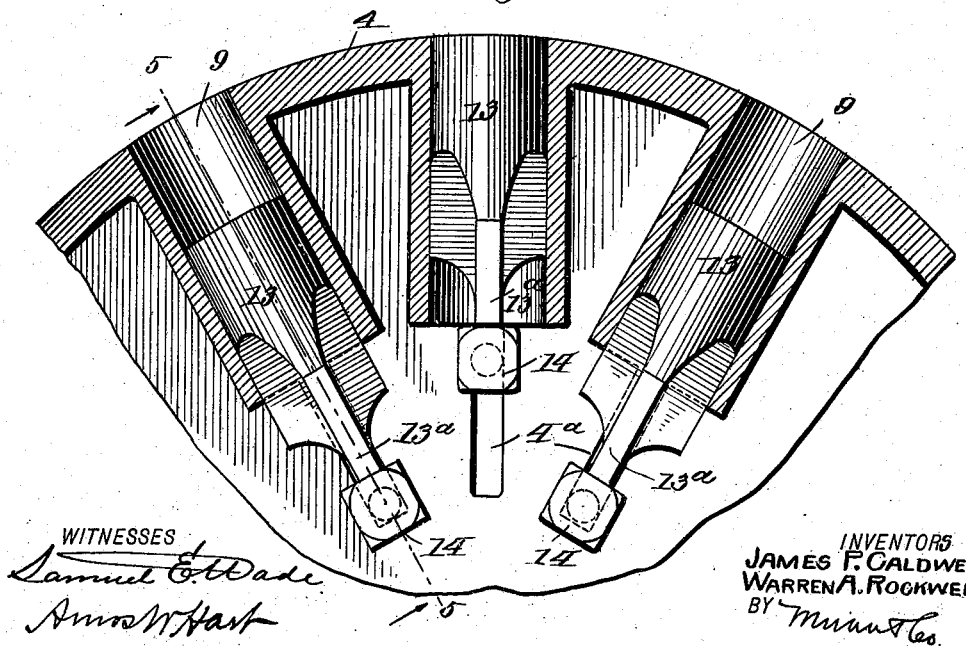
Figure 5:
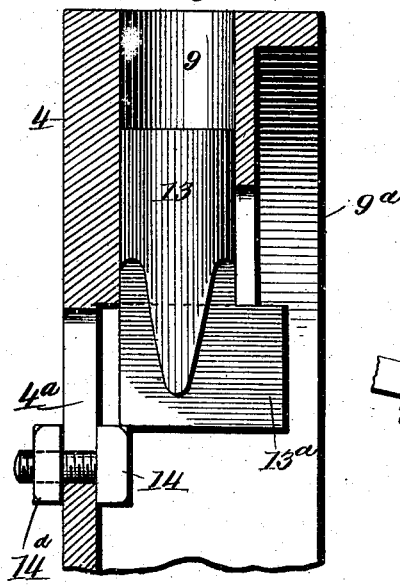
Figure 6:
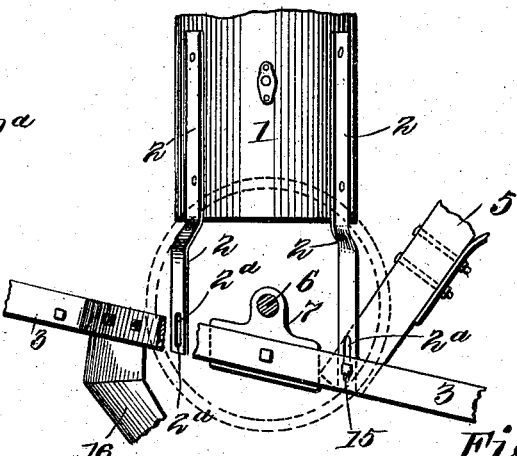
Figure 9:
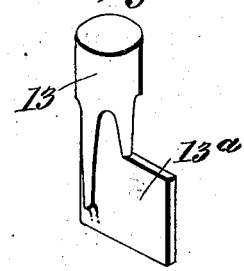
Figure 7:
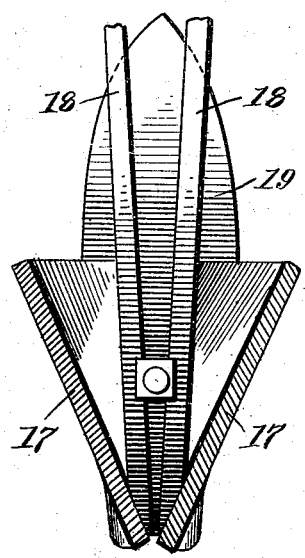
Figure 8:
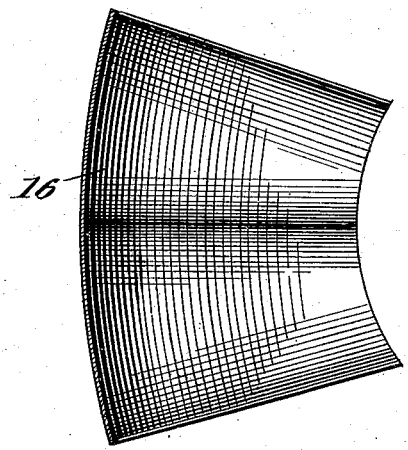

Figure 1 is a perspective view of our improved planter. Fig. 2 is an enlarged sectional elevation of the seed-dropping wheel and the lower portion of the hopper. Fig. 3 is a longitudinal section of the planter. Fig. 4 is an enlarged section of a segment of the seed-dropping wheel, illustrating the arrangement of certain plungers when held out of action for the purpose of varying the distance between the seed-droppings in the furrows. Fig. 5 is a transverse section of a portion of the seed-dropping wheel. Fig. 6 is mainly a side view illustrating the attaching connection of the said hopper with the frame, whereby it is adapted for vertical adjustment. Fig. 7 is an enlarged cross-section of the furrow-opener. Fig. 8 is an enlarged cross-section of the seed-conductor arranged in front of the seed-wheel. Fig. 9 is a perspective view of one of the plungers of the seed-wheel.

A feed-hopper 1 is supported by vertical arms 2 (see Fig. 6) upon the frame 3 of the planter, the latter being formed of two like bars which are bent twice at an obtuse angle in the direction of their length in order to accommodate the seed-wheel 4 between them. Wooden handles 5 are attached to the rear portions of the bars 3 in a well-known manner.

Under the hopper 1 is arranged the seed-wheel 4, the same being provided with a series of radial tubes which extend inward from the periphery and serve as seed receiving and discharging cups, as will be further explained. This wheel is mounted upon the axle 6, which has its bearings in brackets 7, (see Fig. 6,) that are bolted to the side bars 3. Wheels 8 are mounted on the ends of the axle and secured thereon by cotter or linch pins. Thus the planter as a whole is provided with two running or transporting wheels in place of a single wheel being arranged in front of the hopper, as in Mr. Caldwell's patented planters before referred to. The axle and wheels being connected so as to rotate together, it is manifest that the seed-wheel will have a like rotation. As shown in Fig. 2, the bottom of the hopper is almost entirely open, so that the seed has free access to the wheel and fills the pockets 9 as they successively come uppermost. Above the wheel and within the hopper 1 is arranged a stirrer or agitator 10, as shown in Fig. 3, the same consisting of a transverse rotatable shaft carrying castings in which are fixed curved arms projecting at an obtuse angle to each other. There are in practice two sets of these arms, as in Mr. Caldwell's patents before referred to. Rotation is imparted to the agitator from the axle 6 by means of sprocket-wheels 11 and a chain 12, as shown in Fig. 1.

Within each of the tubes or seed-cups 9 is arranged a slidable plunger or piston 13, the same being shown detached in Fig. 9. The inner ends of the several plungers are provided with lateral wings $13^a$. (See Fig. 5.) These wings are arranged in guide-slots $9^a$, formed in the inner sides of each of the tubes or seed-cups 9. The relation of parts is such that when a plunger is projected upward, as illustrated in Fig. 4, with its outer end flush with the periphery of the seed-wheel 4, the wing $13^a$ comes in contact with the upper end of the slot $9^a$, so that it constitutes a stop. A screw-bolt 14 passes through a radial slot $4^a$ in the outer side of the wheel 4 and is provided with a clamp-nut $14^4$. (See especially Fig. 5.)

The several plungers are adapted to slide quite freely in the several tubes or seed-cups 9, and they will obviously slide back and forth as the wheel revolves, being retracted on the rising side and projected as they approach the bottom of the wheel. (See Fig. 2.) It is apparent that the several tubes or cups are filled with seed as they pass under the hopper and that they discharge in the same order as they pass into and through a furrow. Thus the seed is deposited in hills or certain distances apart. In order to regulate the amount of seed thus received and discharged, the plungers may be adjusted as required by means of the bolts 14. Thus when a bolt is arranged, as shown in Fig. 5, at the lowest point permitted by the slot 4$^a$ the adjacent plunger 13 will open to the fullest extent by gravity, and thus the cup will receive seed to its full capacity; but by raising the plunger and securing the bolt 14 at any other point in the slot 4$^a$ the plunger may be prevented from retracting to a corresponding degree, and thus the amount of seed received into the cup will be regulated. Further, it is sometimes desired to plant seeds a distance apart equal to the distance between any two seed-cups, and in such case the intermediate seed cup or cups must be closed. In Fig. 4 the segment of the wheel 4 there illustrated includes three plungers, two being free to open to the full extent and the intervening one being adjusted flush with the periphery of the wheel, which is effected by placing the bolt 14 at the highest point permitted by the slot 4$^a$. Thus the intermediate plunger is held out of action or inactive, so to speak, while the adjacent ones are left free to operate in the usual way. Consequently as the wheel revolves no seed will be received by the intermediate cup, and obviously the distance between the seed-droppings in the furrow will be correspondingly greater. The provision of the adjusting and clamping bolts 14 therefore affords a very ready means for adjusting different plungers according to conditions. Thus the amount of seed discharged is regulated by the position of the bolt in the slot, and of course the quantity of seed varies with the depth of each cup. The size of the seed-wheel bears the proportion to the supporting-wheels 8 of one-half the circumference. In manufacturing the planter it is our purpose to use different sizes of transporting-wheels 8 and seed-wheels 4 and also to vary the number of cups in the seed-wheel, and thereby to obtain a large range of spaces. Thus when all the cups are open and the plungers left free to slide there would be a space or interval of five inches between two successive seed-droppings. With six cups open, every alternate one being closed, the space would be ten inches. With four cups open there would be a fifteen-inch space. With but two cups open, the same being directly opposite, there would be a thirty-inch space, and with but one cup open the space would obviously be sixty inches.

By placing the seed-wheel on the axle and fixing it thereto a positive action is obtained, which is preferable to a sprocket-and-chain connection with a wheel arranged in the front of the hopper, as in the Caldwell patents before referred to.

The lower ends of the bars 2, which support the hopper 1, are provided with lengthwise slots 2$^a$, (see Fig. 6,) and bolts pass through the same for securing the bars to the frame 3. The said slots obviously provide for vertical adjustment of the hopper relative to the seed-wheel 4, which is advantageous or may be necessary in case wheels of different diameters should be employed. It will be noted that the rear bolts 15 of the two which secure the bars 2 to the frame 3 pass also through the adjacent ends of the handles 5, so that two parts are secured by one and the same fastening.

For the purpose of spreading the seed laterally as it drops from the seed-cups we provide in front and beneath the seed-wheel a device 16, formed of a sheet-metal plate which is bent so as to project rearwardly partly under the wheel and is also curved in cross-section, as will be understood by reference to Figs. 3 and 8.

In Figs. 1, 3, and 7 we illustrate a furrow-opener 17, the same being formed of two plates extended horizontally, but arranged at an acute angle to each other, their lower edges being close together and their front ends curved inward and bolted to the lower end of the curved arm or standard 18, that carries the furrow-opener or share 19. The latter projects below the furrow-opener 17 and follows in the furrow, which it further opens and smooths, so that the seed discharged from the wheel 4 will be deposited to the requisite depth.

Coverers 20 are arranged in rear of the point where the seed-wheel discharges, and a grooved roller 21 is supported between spring-arms 22, that are bolted to the handles 5, and serves to roll down and compact the soil pushed into the furrow by the said coverers.

What we claim is—

In a planter of the class described, the combination with a seed-hopper and a seed-dropping wheel having a series of radial peripheral tubes constituting seed-receivers, and a series of radial slots extending inward from the inner ends of said tubes, of plungers which are slidable in the tubes and provided with extensions at their inner ends, and clamping-bolts arranged in the aforesaid slots and provided with nuts for clamping them in any required adjustment in the slots, the inner ends of the bolts being arranged for contact with the ends of the plungers, but which are thus freely slidable and may be set individually or collectively to form a larger or smaller seed-receptacle or to close any selected receptacle entirely, substantially as described.

JAMES PHILO CALDWELL.
WARREN AYRES ROCKWELL.

Witnesses to signature of Jas. P. Caldwell:
WILEY L. DERRICK,
R. E. ARNETTE.

Witnesses to signature of W. A. Rockwell:
A. C. DAGUE,
H. K. SANDER.